No. 614,132. Patented Nov. 15, 1898.
C. T. REICHERT.
PIGEON TRAP.
(Application filed Mar. 4, 1898.)
(No Model.)

Witnesses:
E. F. Dowling.
G. C. Miller.

Inventor:
Charles T. Reichert.
Per Morrison Miller
Att'ys.

UNITED STATES PATENT OFFICE.

CHARLES T. REICHERT, OF BELVIDERE, ILLINOIS.

PIGEON-TRAP.

SPECIFICATION forming part of Letters Patent No. 614,132, dated November 15, 1898.

Application filed March 4, 1898. Serial No. 672,602. (No model.)

*To all whom it may concern:*

Be it known that I, CHARLES T. REICHERT, a citizen of the United States, residing at Belvidere, in the county of Boone and State of Illinois, have invented certain new and useful Improvements in Pigeon-Traps, of which the following is a specification.

The object of this invention is the production of a trap for the discharge of a captive pigeon for shooting purposes.

Figure 1:
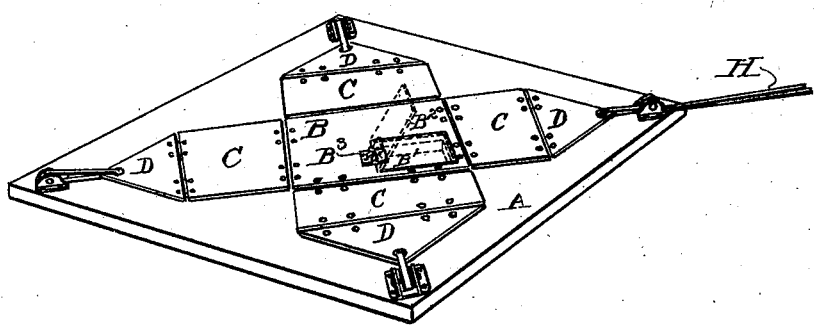
Figure 5:
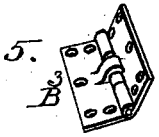
Figure 2:
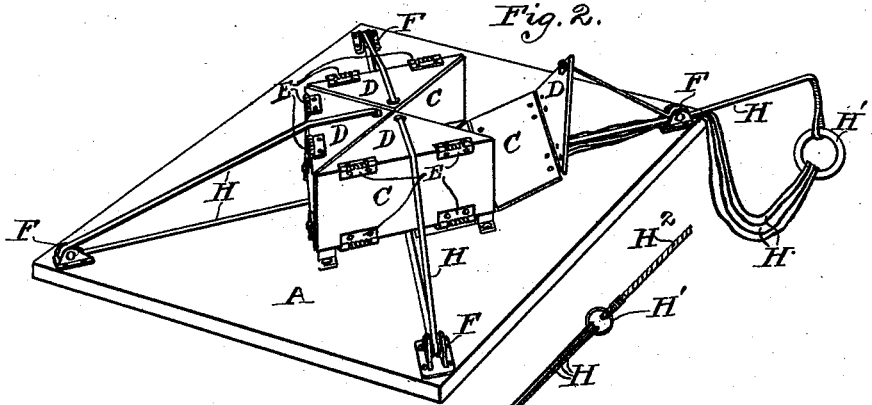
Figure 4:
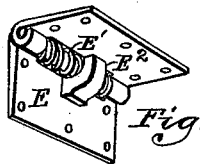
Figure 3:
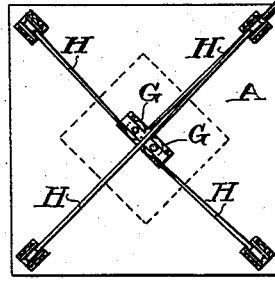

In the accompanying drawings, Figure 1 is a view of my pigeon-trap unfolded. Fig. 2 is a view of the same all folded except one section, which is drawn backward against the action of its closing-springs. Fig. 3 is a plan view partly cut away to illustrate the course and direction of the operating-straps. Fig. 4 is a perspective view of the stop-hinge for connecting the members of the folding box, and Fig. 5 is a similar view of the stop-hinge for the closure on the bottom of the folding box.

A is the base-board for the trap.

B is the bottom of the folding box, which constitutes the trap proper.

B' is an opening in the bottom B. This opening extends through the base-board A.

$B^2$ is the hinged closure for said opening.

$B^3$ is a stop-hinge arranged to permit the closure $B^2$ to open only a little distance, not far enough to stand ajar.

C are the hinged folding sides, and D the triangular-shaped sections composing the top of the trap proper.

E are hinges which connect the bottom B with the sides C and attach the top sections D to the sides. The tendency of the springs E' is to close the box of the trap, the stops $E^2$ on the hinges preventing the folding of the parts upon one another.

F are sheaves affixed to the base-board at each corner thereof.

G are similar sheaves near the middle of the base-board A.

H are straps for drawing the sections of the trap into a horizontal position, as shown in Fig. 1.

H' is a ring in which all the straps H unite and to which the cord $H^2$ for opening the trap is attached.

In operation the trap is fastened to the ground and a pigeon placed within the folded box. The releasing-cord $H^2$ is tied into the ring H', the other end extending to a point of safety, usually near to the marksman. When it is desirable to release the bird in the trap, the releasing-cord $H^2$ is drawn and the folding box opened sufficiently to permit the pigeon to escape.

The trap may be loaded—that is to say, the bird may be placed therein—either from the top by opening one section of the folding box, as in Fig. 2, or, as is more usual, the base-board is set over a hole in the ground, permitting the trap to be filled by a boy in the hole inserting the pigeons through the opening B' of the bottom B.

From the foregoing description it will be understood that each section comprising the folding box may be operated independently of the other sections.

I claim as my invention—

1. In a pigeon-trap, in combination, a base-board, a folding box mounted on the base-board, comprising a box-bottom having an opening therein and a closure for said opening, sides in sections hinged to the box-bottom, a cover in sections hinged to the sides, stops and springs for the hinges, a strap for each section of the cover, and pulleys for supporting the straps, substantially as and for the purpose specified.

2. In a pigeon-trap, in combination, a base-board, a folding box mounted on the base-board comprising a box-bottom having an opening therein and a closure for said opening, four sides for said box, hinges connecting the sides with the bottom, a cover in four sections, hinges for connecting the cover-sections to the side sections, stops for limiting the movement of the side sections with relation to the bottom and of the cover-sections with reference to the side sections, springs for actuating said connecting-hinges, a strap having connection with each of the cover-sections and pulleys for supporting the straps, substantially as and for the purpose specified.

CHARLES T. REICHERT.

Witnesses:
L. L. MILLER,
NELLIE BUNKER.